United States Patent
Kariv (10) Patent No.: US 7,698,593 B2
(45) Date of Patent: Apr. 13, 2010

(54) DATA PROTECTION MANAGEMENT ON A CLUSTERED SERVER

(75) Inventor: Asaf Kariv, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 11/205,360

(22) Filed: Aug. 15, 2005

(65) Prior Publication Data

US 2007/0038888 A1    Feb. 15, 2007

(51) Int. Cl.
    *G06F 11/00* (2006.01)
(52) U.S. Cl. ....................................................... 714/10
(58) Field of Classification Search .................... 714/10
    See application file for complete search history.

(56) References Cited

U.S. PATENT DOCUMENTS

| | | | | |
|---|---|---|---|---|
| 5,996,088 A | * | 11/1999 | Frank et al. | 714/6 |
| 6,144,999 A | * | 11/2000 | Khalidi et al. | 709/219 |
| 6,336,171 B1 | * | 1/2002 | Coskrey, IV | 711/152 |
| 6,553,401 B1 | * | 4/2003 | Carter et al. | 709/200 |
| 6,775,703 B1 | * | 8/2004 | Burns et al. | 709/228 |
| 2002/0078263 A1 | * | 6/2002 | Darling et al. | 709/331 |
| 2003/0061240 A1 | * | 3/2003 | McCann et al. | 707/200 |
| 2004/0143607 A1 | * | 7/2004 | Beck | 707/201 |
| 2005/0039069 A1 | * | 2/2005 | Prahlad et al. | 714/2 |
| 2006/0036895 A1 | * | 2/2006 | Henrickson | 714/4 |
| 2006/0136685 A1 | * | 6/2006 | Griv et al. | 711/162 |
| 2006/0179058 A1 | * | 8/2006 | Bram et al. | 707/9 |

OTHER PUBLICATIONS

"Backup Exec," Veritas Software, © 2005 Symantec Corporation, veritas.com/us/products/backupexec/> [retrieved Nov. 22, 2005].
"Double-Take," © 2005 NSI Software, Inc., nsisoftware.com/what-we-offer/double-take/> [retrieved Nov. 22, 2005].

* cited by examiner

*Primary Examiner*—Scott T Baderman
*Assistant Examiner*—Yair Leibovich
(74) *Attorney, Agent, or Firm*—Workman Nydegger (57) ABSTRACT

A data protection management system for protecting content controlled by a clustered server is presented. The data protection management system includes a data protection server and a data storage pool. The data storage pool is coupled to and controlled by the data protection server for storing a replicated copy of the protected content. The data protection management system also includes a file system filter deployed on each cluster node in the clustered server. Each file system filter is configured to, upon receiving notice of a modification to the protected content, generate a change record comprising information describing the modification such that the data protection server can effectuate the same modification on the replicated content in the data storage pool corresponding to the protected content. The data protection server communicates with the clustered server as a single server in providing data protection to the protected content.

8 Claims, 9 Drawing Sheets

Prior Art

DATA PROTECTION MANAGEMENT ON A CLUSTERED SERVER

BACKGROUND

Frequently, businesses, institutions, and the like use data protection management systems to protect their data from accidental loss and/or corruption. Simply stated, a data protection management system replicates information from protected volumes into a storage pool. If and when it is needed, the replicated information in the storage pool can be retrieved.

Figure 1:
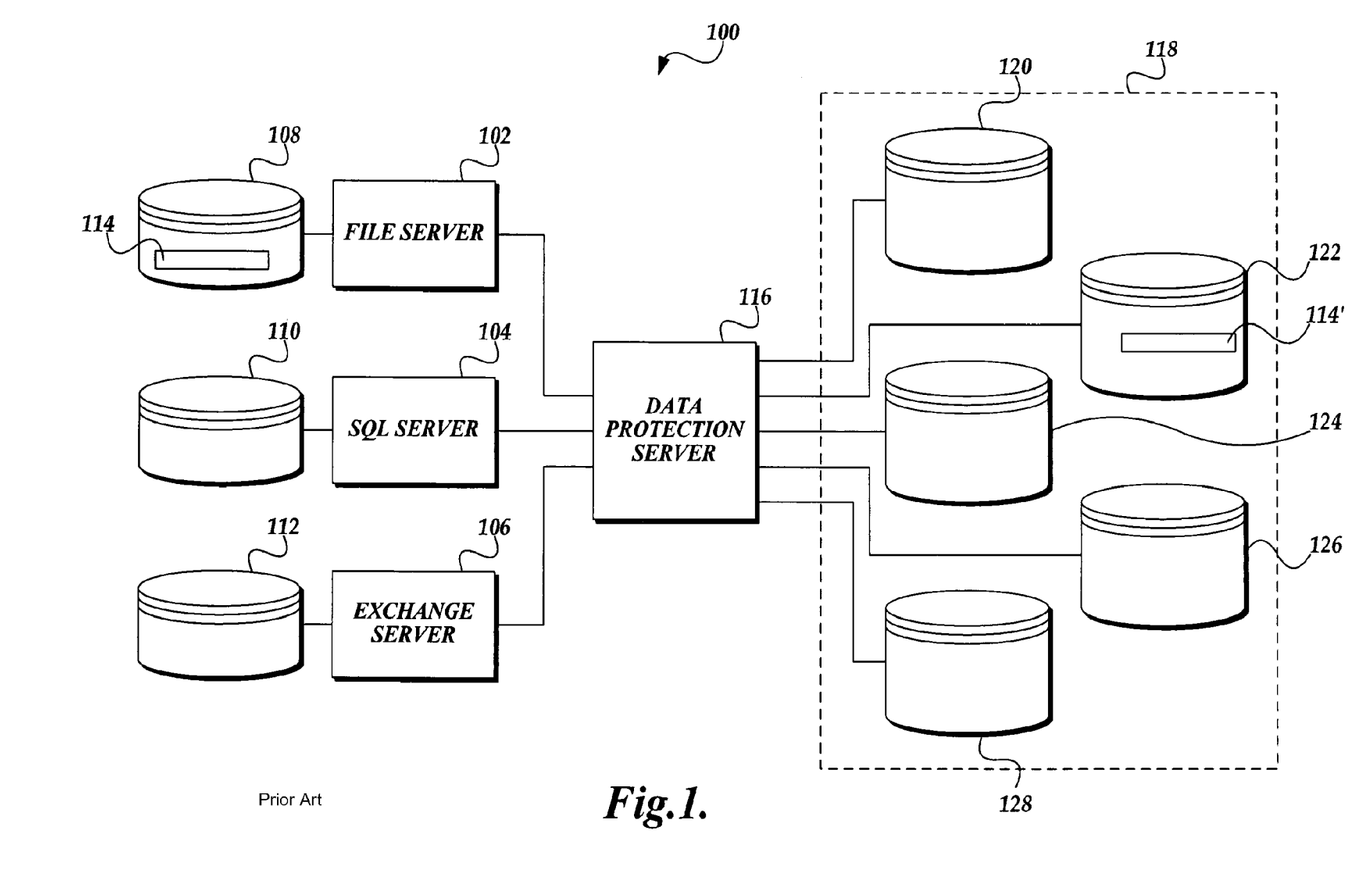
FIG. 1 is a block diagram illustrating an exemplary data protection management environment.

FIG. 1 is a block diagram illustrating an exemplary data protection management environment 100. Shown in FIG. 1 are three separate servers, file server 102, SQL server 104, and Exchange server 106. Each of these servers 102-106 is illustrated as being connected to a storage device, storage devices 108-112 respectively. These storage devices may be protected in whole, or in part, by the data protection server 116. The protected content, i.e., that content on a server which is designated for protection by the data protection management system, is replicated by the data protection server 116 into a storage pool 118 associated with the data protection server 116. For example, assuming that content in volume 114 on the storage device 108 connected to file server 102 is to be protected, this volume is (at some point) replicated into the storage pool 118 by the data protection server 116, such as shown by volume 114' on storage device 112.

As those skilled in the art will appreciate, the storage pool 118 typically comprises a number of large storage devices, such as storage devices 120-128. The storage devices 120-128 are typically slower and cheaper than those used or connected to the various protected servers, such as storage devices 108-110. The storage pool 118 can use slower devices since they are not relied upon for immediate storage purposes, nor needed in normal operation of the protected server, such as file server 102. Instead, their use is in replicating and restoring files, and as such, higher latency times can be tolerated.

Assuming the contents of protected volume 114 on the storage device 108 is lost, corrupted, or otherwise needed from another location, a process directs the data protection server 116 to retrieve the replicated volume 114' from the storage pool 118 and return it to the process, either to store it back onto the storage device 108 or use it some other manner.

With many data protection management systems 100, such as Microsoft Corporation's System Center Data Protection Manager, data protection occurs in two stages. The first stage involves simply copying/replicating the protected content (i.e., volumes, files, storage devices, etc.) from the protected server, such as file server 102, to the data protection server's storage pool 118. Once the protected content is in the storage pool 118, the second stage involves capturing modifications to the protected content and making those changes to the replicated content in the storage pool. Capturing the modifications to the protected content is described below in regard to FIG. 2.

Figure 2:
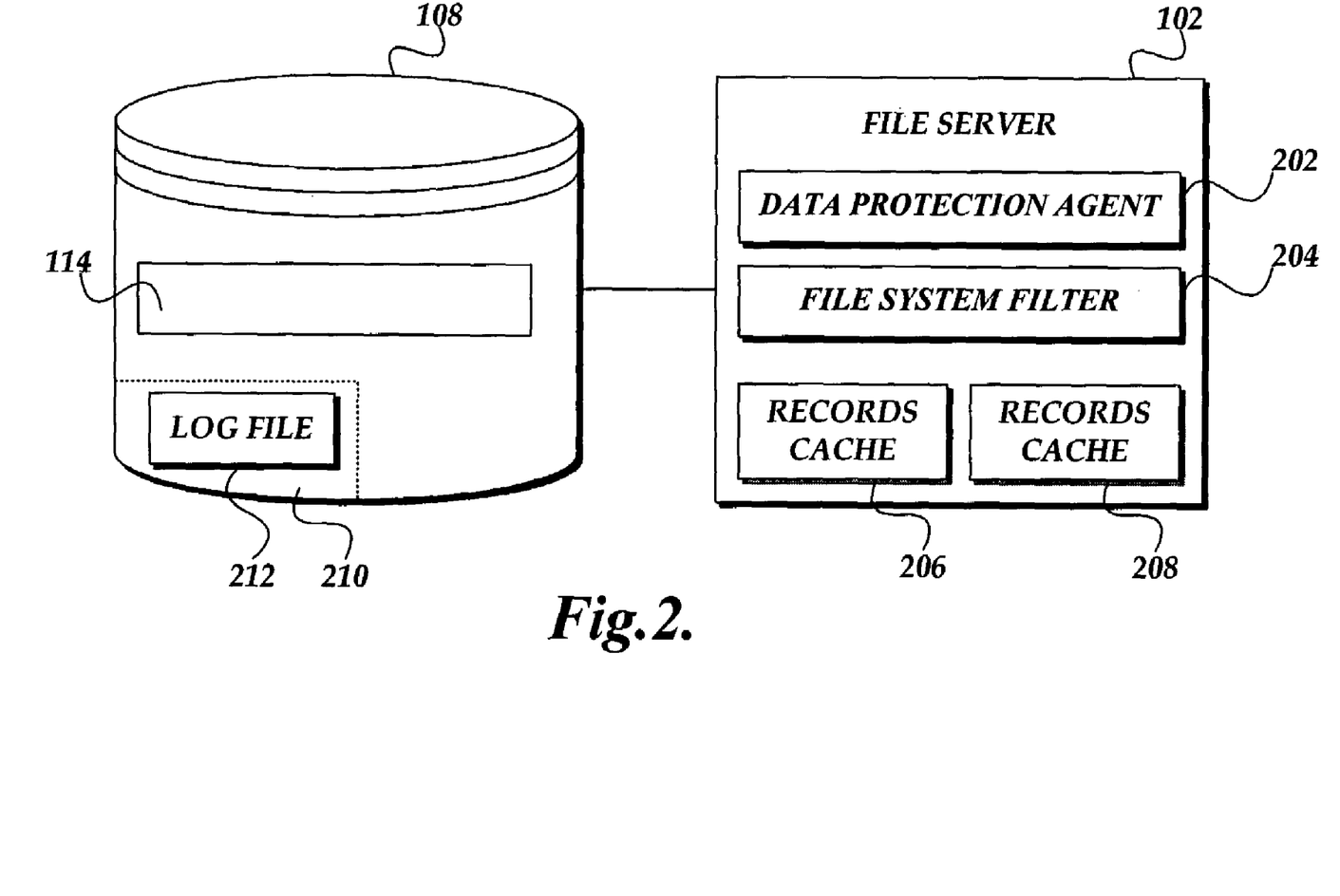
FIG. 2 is a block diagram illustrating various components installed on a server for protecting content associated with the server in conjunction with a data protection server.

FIG. 2 is a block diagram illustrating various components installed on a server, such as file server 102, for protecting content associated with the server in conjunction with a data protection server 116. In particular, components installed on the file server 102 include a data protection agent 202 and a file system filter 204. The file system filter 204 interacts with the operating system to detect modifications to the protected content on the file server 102. In short, the file system filter 204 hooks into the operating system, typically on the kernel level, such that it acts as an extension of the operating system that detects when modifications are made to protected content. As those skilled in the art will appreciate, perhaps the most use of the file system filter 204 are in regard to anti-virus applications which scan particular file types for corruption, malware, etc.

The data protection agent 202 is the user mode counterpart of the file system filter 204 on the file server 202. The data protection agent 202 is in communication with the data protection server 116 in handling requests for the initial replicated content, log files (a collection of change records described below), and restoration requests. In many cases, the data protection agent 202 is the link between the file system filter 204 and the change records, and the data protection server 116.

With regard to the file server 102, as modifications are made to protected content, the file system filter 204 captures these modifications and records each modification as a change record in a records cache, such as records caches 206 or 208. Typically, a file server 102 will include multiple records caches that are usually retained in random access memory.

With regard to the change records, it should be appreciated that each change record represents a single modification action only, not the entirety of a modified file. For example, if a file is modified by overwriting a particular range of updated data, only the action to be taken (i.e., write), the file identifier, the range, and the updated data are written to a change record. Action specific information is recorded with each type of modification to the protected content (create, deletion, etc.) that is needed to capture the essence of the modification. As those skilled in the art will appreciate, by subsequently applying the change records to the replicated content, the replicated content is brought "up-to-date" with the modified protected content on the file server system.

As indicated above, records caches are typically random access memory areas and are of limited size. Thus, as a records cache fills, the change records in the cache are transferred to a log file 212 in a special area 210 on the protected volume that is not protected in the typical manner by the data protection management system. The change records in the records caches 206 and 208 are also transferred to the log file 212 on external directives to "flush" their contents (change records) to the log file.

On a periodic basis, the data protection server 116 requests the log file from the protected file server 102, via the data protection agent 202. In order to properly field the request, the data protection agent 202 will typically direct the file system filter 204 to first flush any change records cached in the records caches to the log file 212. Thereafter, the contents (change records) of the log file 212 are transferred to the data protection server 166, and the data protection server applies the change records from the log file to the replicated content in the storage pool 118, thereby bringing the replicated content up to date with the protected content.

At least one problem with the data protection model described above is when a protected server, such as file server 102 is actually a clustered file server, or cluster for short. As appreciated by those skilled in the art, a cluster is a group of independent computers that operate collectively and appear to a client (user or other computers) as if it were a single computer system. Clusters are designed to improve capacity and ensure reliability in the case of a failure. For example, when one of the nodes in the cluster fails, the operations carried out by that cluster can be shifted over to another cluster node. Unfortunately, this "failover" is also the source of difficulties with regard to data protection management.

Figure 3A:
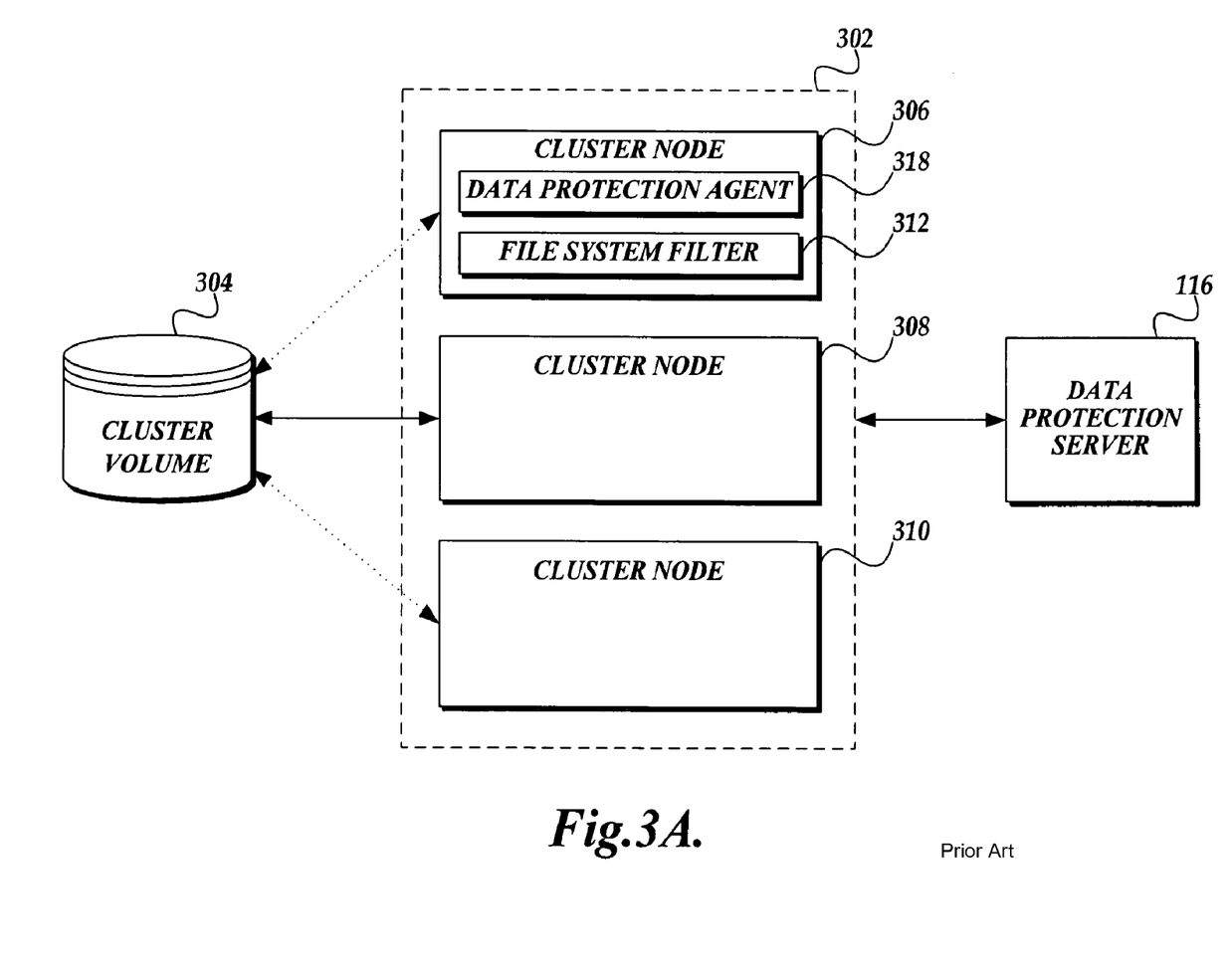
FIGS. 3A and 3B are block diagrams illustrating potential ways in which a data protection server can interact with a clustered server, and the problems related therein.
Figure 3B:
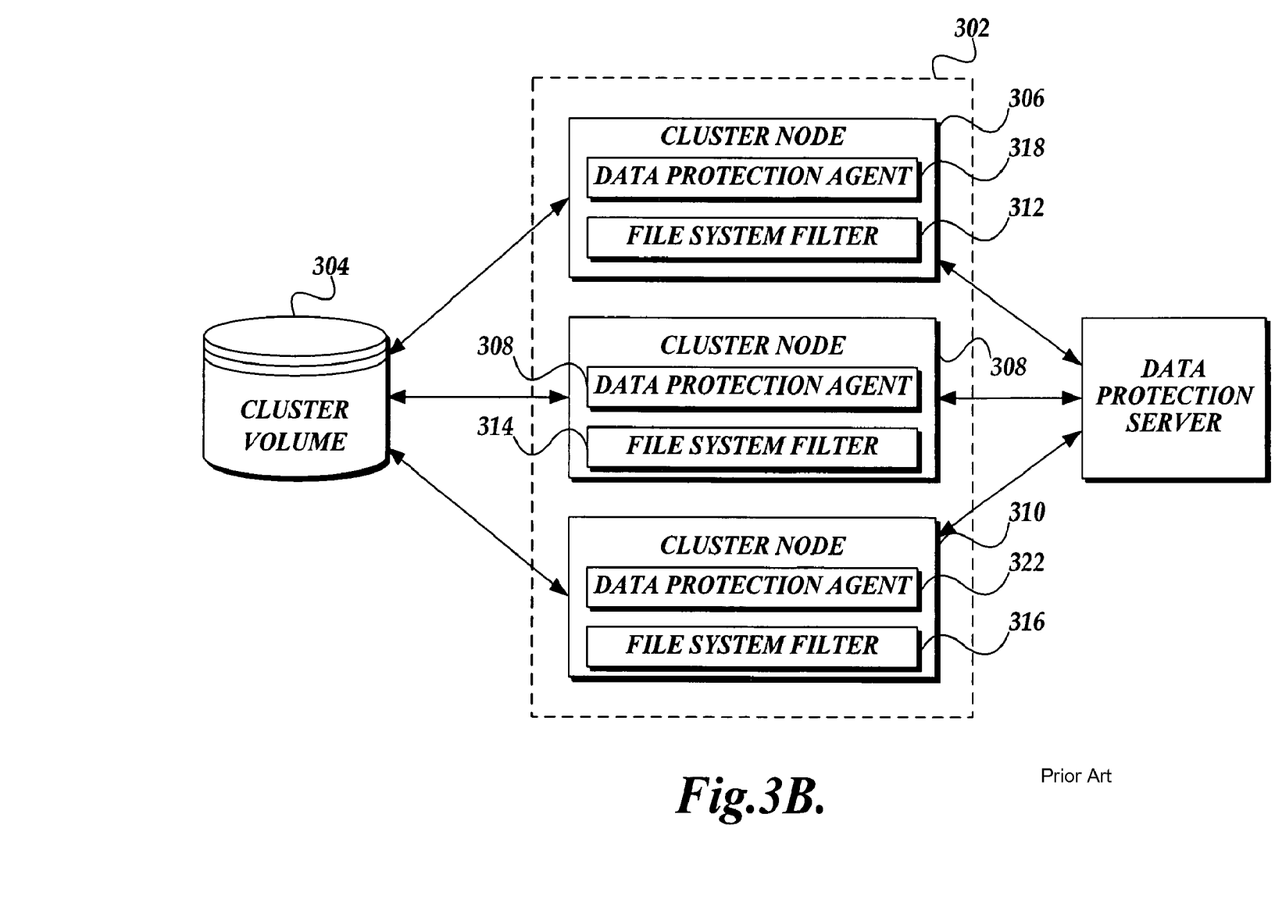

FIGS. 3A and 3B are block diagrams for illustrating suggested ways in which a data protection server can interact with a clustered server, and the problems related therein. With regard to FIG. 3A, this block diagram illustrates the data protection server 116 operating with a cluster 302, treating the cluster as a single file server with a protected content. The cluster 302 is shown as including three cluster nodes, nodes 306-310, but this is for illustration purposes only, and should not be construed as limiting upon the present invention.

As shown in FIG. 3A, when treating the cluster 302 as a single file server, only one data protection agent 318 and one file system filter 312 have been deployed onto the cluster, and arbitrarily they were placed on node 306.

As those skilled in the art will appreciate, in a clustered environment, even though all cluster nodes are potentially able to communicate with a particular volume 304, only one cluster node, such as cluster node 308, can communicate with the volume at any one time. All other connections between the cluster's nodes and the volume are potential, not actual connections (as illustrated by the dotted connecting lines.) As a product of the cluster, any reads, writes, creations, deletions, etc., that affect the content on the volume 304 are directed to the one cluster node 308 that is in current, actual communication with the volume.

In this light, one problem with treating the cluster 302 as a single entity, that is quite evident with regard to data protection management, is that only one data protection agent 318 and file system filter 312 is deployed on the cluster, and it may or may not actually correspond to the cluster node 308 that is in actual communication with the volume 304. Thus, modifications directed to the volume 304 may or may not be recorded by the file system filter 312, and the ability of the data protection server 116 to update the replicated content would be lost. Of course, even if the data protection agent 318 and file system filter 312 were initially installed on the same cluster node that had actual communication with the cluster volume 304, the nature of cluster technology is that upon any number of conditions, e.g., node failure, reallocation of process, etc., the cluster node with the actual connection may change. As such, even if the data protection agent 318 and file system filter 312 are installed on the cluster node in actual communication with the protected cluster volume 304, the data protection system could not be trusted to provide reliable data protection.

On the other hand, as illustrated in FIG. 3B, the data protection management system could alternatively distribute data protection agents, such as data protection agents 318-322, and file system filters, such as file system filters 312-316, on each cluster node 306-310. This means, of course, that the data protection server 116 must be cluster-aware, and as such, the data protection server must communicate with all data protection agents 318-322 to obtain the change records/log file for the protected content. Of course, each file system filter 312-316 may have change records stored in one or more records caches 206-208, depending on when a failover or transfer of duties occurred among the various cluster nodes with regard to actual communication with the cluster volume 304 (assuming it is the protected content). At its best, this means substantial extra work for the data protection server 116 in resolving the sequences of when the various change records occurred. However, more likely, this means that upon failover or transfer in the cluster 302, the sequence of change records recorded by the various file system filters 312-316 in the records caches becomes hopelessly obscured, to the point that any attempt by the data protection server 116 to apply the modifications outlined by the change records to the replicated content could only result in corrupting the replicated content.

It is for these reasons described above that some data protection management systems simply exclude clusters from their protection.

SUMMARY

A data protection management system for protecting content controlled by a clustered server is presented. The data protection management system includes a data protection server and a data storage pool. The data storage pool is coupled to and controlled by the data protection server for storing a replicated copy of the protected content. The data protection management system also includes a data protection agent and a file system filter deployed on each cluster node in the clustered server. Each file system filter is configured to, upon receiving notice of a modification to the protected content, generate a change record comprising information describing the modification such that the data protection server can effectuate the same modification on the replicated content in the data storage pool corresponding to the protected content in conjunction with the change record. The data protection server communicates with the clustered server as a single server in providing data protection to the protected content.

A computer-readable medium bearing computer-executable instructions is also presented. When executed on a computer system, the computer-executable instructions carry out a method for providing data protection services to content on a clustered server. The method comprises the following. A determination that the clustered server is a cluster is made. Each cluster node in the clustered server is initialized with a data protection agent and a file system filter. A copy of the protected content is obtained from the clustered server as a single server. A copy of the protected content is created in a data storage pool coupled to the computer system, the copy being the replicated content. Periodically, a log file is obtained from the clustered server as a single server. The log file comprises one or more change records identifying modifications made to the protected content. The modifications identified by the change records in the log file are applied to the replicated content in the data storage pool.

A data protection management system for protecting content controlled by a clustered server is presented. The data protection management system comprises a data protection server and a data storage pool. The data protection server is communicatively coupled to the clustered server for providing data protection to the protected content on the clustered server. The data protection server communicates with the clustered server as a single server in providing data protection to the content. The data storage pool is coupled to and controlled by the data protection server for storing a replicated copy of the protected content. The data protection management system also comprises a data protection agent and file system filter deployed on each cluster node in the clustered server. Each file system filter is configured to receive notice of a modification to the protected content. Each file system filter is further configured to generate a change record comprising information describing the modification such that the data protection server can implement the same modification on the replicated copy of the protected content in the data storage pool in conjunction with the change record. Each file system filter is still further configured to record the change records in one of a plurality of records caches on its cluster node.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

For purposes of the following discussion, the term "protected content" will be used to refer to content controlled by a server that is to be protected. The protected content may comprise a few files on a storage device connected to the server, a logical volume on the storage device, or the entire storage device/volume. Additionally, the term "replicated content" will be used to refer to the copy of the protected content that has been replicated in the data storage pool 118.

Figure 4:
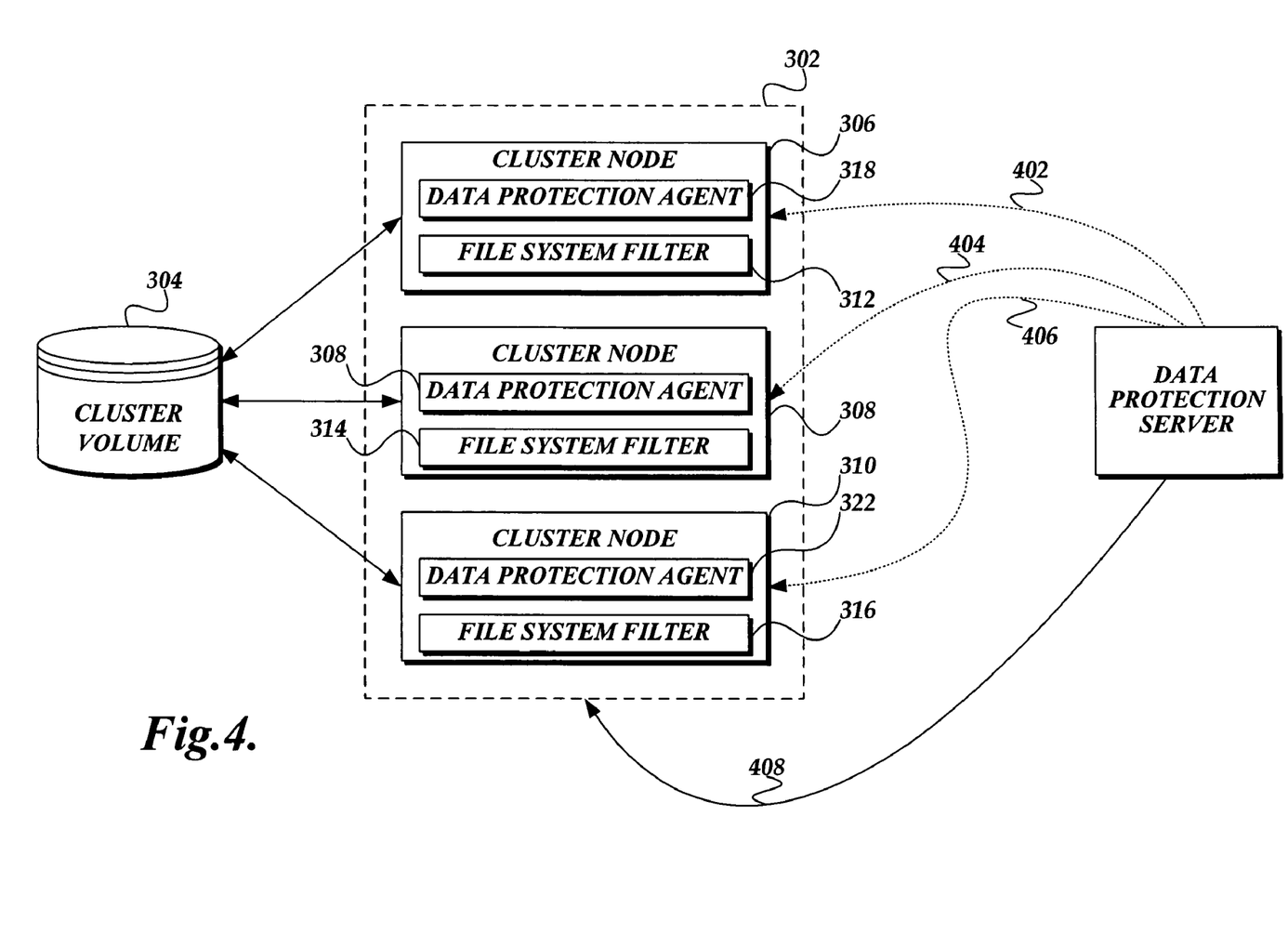
FIG. 4 is a block diagram illustrating a way in which a data protection server can interact with a clustered server to provide protection for content associated with the clustered server.

In order to provide data protection management to a clustered server, a hybrid approach of the above-discussed manners is utilized. FIG. 4 is a block diagram illustrating the present way in which a data protection server 116 can interact with a clustered server 302 to provide protection for protected content 304 associated with the clustered server.

The data protection server 116 is cluster-aware, meaning that when content associated with a server is identified to the data protection server to be protected, the data protection server recognizes whether or not the server, such as clustered server 302, is a cluster. If so, in the initialization phase, the data protection server 116 identifies the cluster nodes, such as cluster nodes 306-310, of the clustered server 302 and initializes each cluster node with a data protection agent, as indicated by data protection agents 318-322, and a file system filter, including file system filters 312-316. The dashed lines 402-406 from the data protection server 116 to the cluster nodes 306-310 indicate aware communications between the data protection server and the cluster nodes during the initialization process phase.

As discussed above, only one cluster node in the clustered server 302 has actual/current communication with the volume/device corresponding to the protected content at a time. However, when failover occurs, or when the clustered server 302 needs to re-align responsibilities among its cluster nodes which requires a change in the cluster node with actual/current communication to the cluster volume 304, the file system filter installed on the cluster node with current access to the protected content is notified and/or detects the pending dismount. Upon notice of a pending dismount, the file system filter flushes the change records in the records caches to the log file. Of course, this illustrates one reason why the log file should be located on the volume/device 304 of the protected content (though there is no need for the log file to be part of the protected content).

Once each cluster node 306-310 in the clustered server 302 has been initialized with a data protection agent and file system filter, the data protection server 116 shifts away from operating in a cluster-aware manner, and into a so-called cluster-agnostic manner. More particularly, once each cluster node is initialized, the data protection server 116 then communicates with the clustered server 302 (and its protected content) as a single server, not to the individual cluster nodes, as indicated by solid arrow 408. Communications from the data protection server 116 are received and routed by the clustered server 302 to the cluster node, such as cluster node 318, with current access/control over the protected content 304. Similarly, of course, all modifications to the protected content 304 are also routed to the cluster node with current access/control by the cluster 302.

Figure 5:
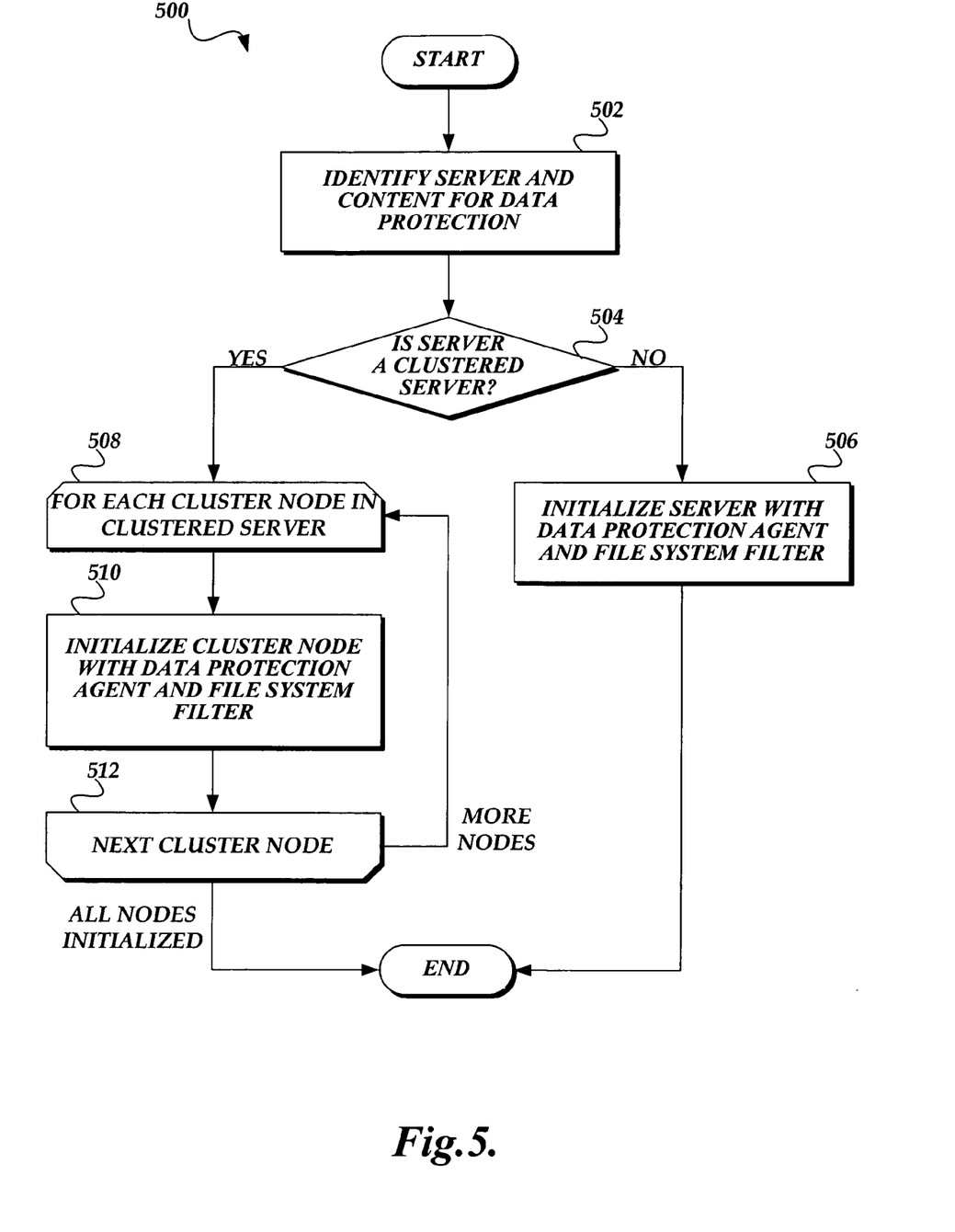
FIG. 5 is a flow diagram illustrating an exemplary routine for initializing a server, including a clustered server, with a data protection agent and file system filter.

As indicated above, during initialization of a clustered server, the data protection server 116 is cluster-aware. In this regard, FIG. 5 is a flow diagram illustrating an exemplary routine 500 for initializing a server, including a clustered server 304, with one or more data protection agents and file system filters. Beginning at block 502, a server and corresponding content to be protected by a data protection management system are identified to the data protection server 116.

At decision block 504, a determination is made by the data protection server 116 as to whether the identified server is a clustered server 302. If the server is not a clustered server, at block 506 the server is initialized with a data protection agent and a file system filter. Thereafter, the routine 500 terminates.

If the identified server is a clustered server 302, at control block 508 a looping structure is commenced which iterates through each cluster node in the clustered server. Thus, at block 510, a cluster node is initialized with a data protection agent and file system filter. End control block 512 corresponds to control block 508 such that the routine returns to control block 508 if there are more cluster nodes to be initialized in the clustered server 302. However, if all cluster nodes have been initialized, the routine 500 terminates.

Figure 6A:
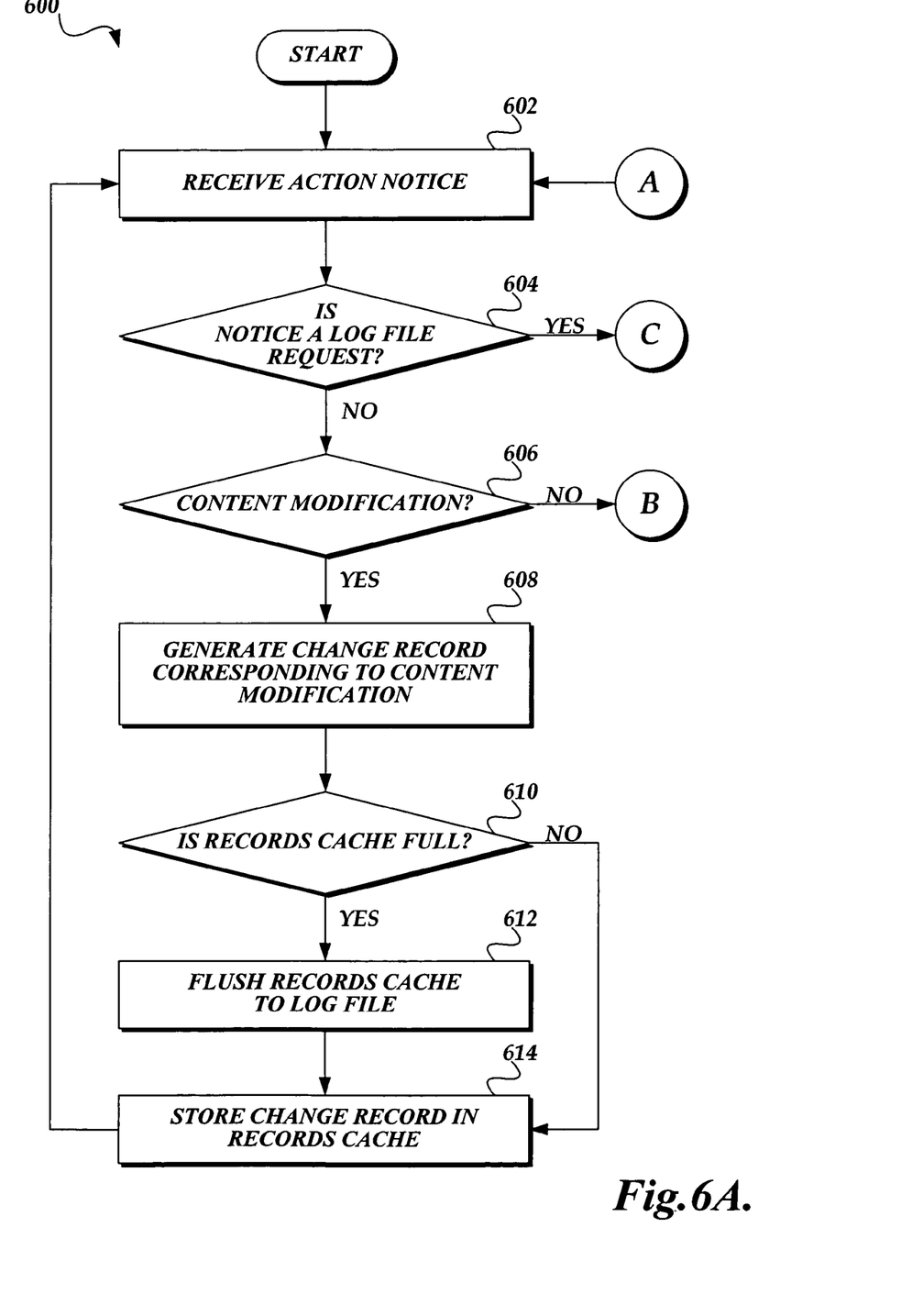
FIGS. 6A and 6B are a flow diagram illustrating an exemplary routine, implemented by a data protection system on a cluster node, for generating change records corresponding to modifications to protected content associated with the clustered server, and for storing the change records for subsequent use by a data protection server.
Figure 6B:
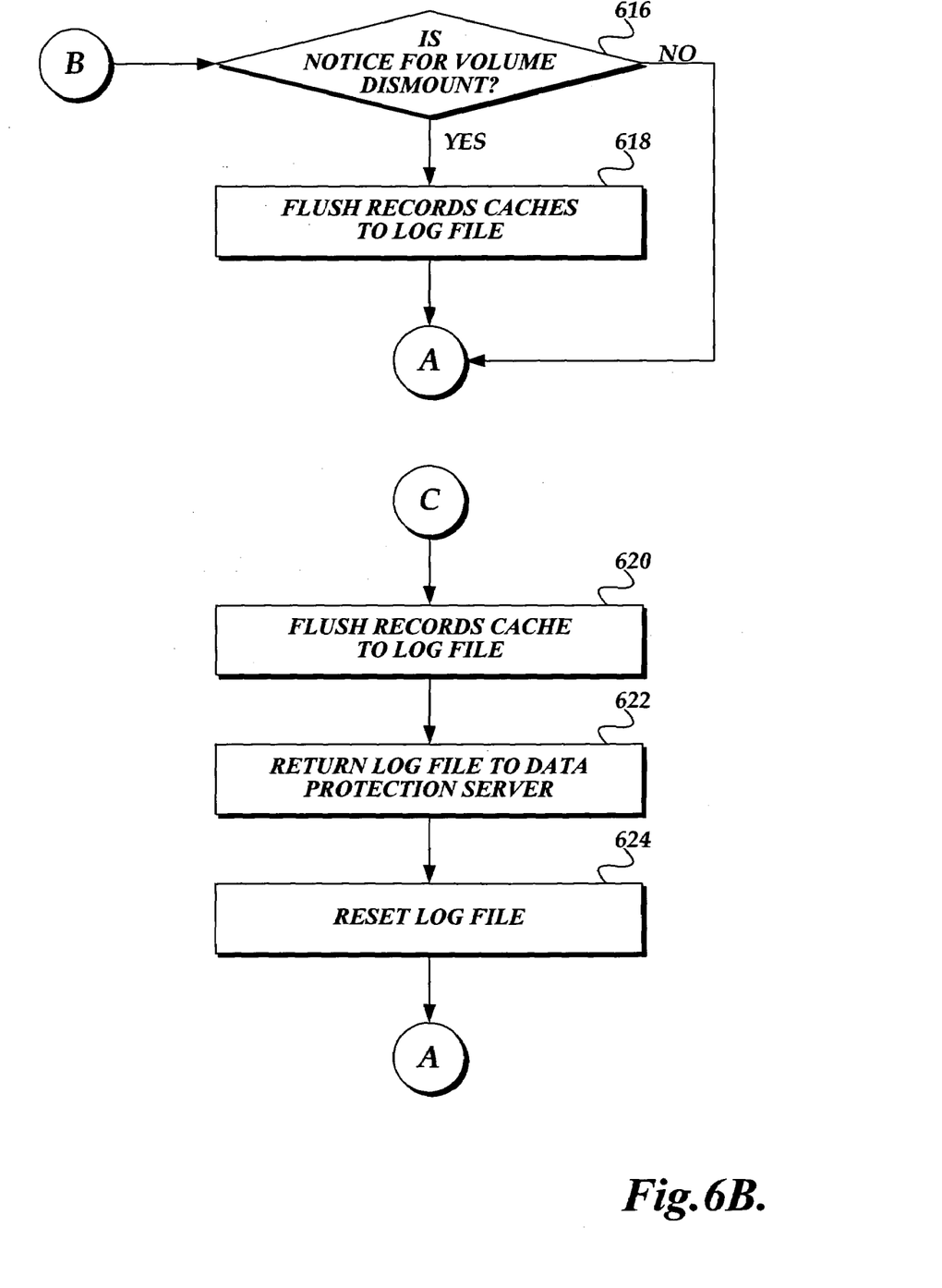

FIGS. 6A and 6B are a flow diagram illustrating an exemplary routine 600, implemented by a file system filter 312 on a cluster node 306, for generating change records corresponding to modifications of protected content managed by the clustered server, and for storing the generated change records for subsequent use by a data protection server 116.

Beginning at block 602, the file system filter 312 receives an action notice. As will be discussed further below, the action notices may include notice of a modification to protected content, notice that the cluster node currently in communication with the protected content will be dismounted from the protected content, and a request from the data protection server 116 via the data protection agent 318 for the log file 212. Of course, these actions are only illustrative of some of the notices and operations of the file system filter 312, and thus should not be construed as limiting the actions and/or operations of the data protection agent.

At decision block 604, a determination is made as to whether the received notice is for the log file (i.e., a request, via the data protection agent 318 from the data protection server 116, for the log file). If the notice is for the log file, the routine 600 proceeds to block 620 (FIG. 6B) described below.

However, if the received action is not for the log file, the routine 600 proceeds to decision block 606.

At decision block 606, a determination is made as to whether the action is indicative of content modification, particularly of protected content modification. If the notice is not indicative of protected content modification, the routine 600 proceeds to block 616 (FIG. 6B) described below. Alternatively, if the notice is indicative of protected content modification, the routine 600 proceeds to block 608.

At block 608, the file system filter 312 generates a change record that identifies the modification action (write, delete, rename, etc.) to the protected content. Depending on the particular modification action, the change record includes information that would enable the data protection server 116 to make the same changes on the replicated content.

Once the log file is generated, at decision block 610, a determination is made as to whether a records cache is full such that the newly generated change record cannot be added. If the records cache is full, at block 612, the records cache is flushed to the log file 212. Thereafter, or if the records cache is not full, the file system filter 312 stores the newly generated change record in the records cache 206.

In an alternative embodiment (not shown), multiple records caches may exist. In this environment, as one records cache 206 fills, the file system filter 312 turns to another records cache 208 and begins to fill it. As the second records cache 208 is being filled, a process, typically a background process, flushes the contents of the filled records cache 206 to the log file 212. It is, of course, very important that the change records in the records caches be flushed to the log file 212 in the order that they occurred. Failure to do this will typically result in corruption of the replicated content in the data storage pool 118 when the data protection server 116 applies the modifications per the change records in the log file 212.

At block 614, the newly generated change record is written in the records cache. Thereafter, the routine 600 returns to block 602 to await additional actions.

As indicated above, at decision block 604, if the notice is a request for the log file, the routine 600 proceeds to block 620 (FIG. 6B). At block 620, the file system filter 312 flushes the contents of the records cache (or records caches if there is more than one records cache) to the log file 212. At block 624, the file system filter 312 then returns the log file 212 to the data protection server 116, typically via the data protection agent 318. After returning the log file 212 to the data protection server 116, the log file is reset/emptied. Thereafter, the routine 600 returns to block 602 (FIG. 6A) to await additional actions.

Also indicated above, at decision block 606 (FIG. 6A), if the action notice is not indicative of protected content modification, the routine 600 proceeds to decision block 616. At decision block 616, a determination is made as to whether the action notice is advising that the volume (where the protected content is stored) will be dismounted from the cluster node 306. If this is not a notice that the volume will be dismounted from the cluster node 306, for purposes of this exemplary routine, the action request is discarded and the routine 600 returns to block 602 (FIG. 6A) to await additional actions.

Alternatively, if the action notice is indicative of a pending volume dismount, at block 618, the file system filter 312 flushes the change records in the records cache 206 (or records caches if there is more than one) to the log file 212. Thereafter, the routine 600 returns to block 602 (FIG. 6A) to await additional actions.

Figure 7:
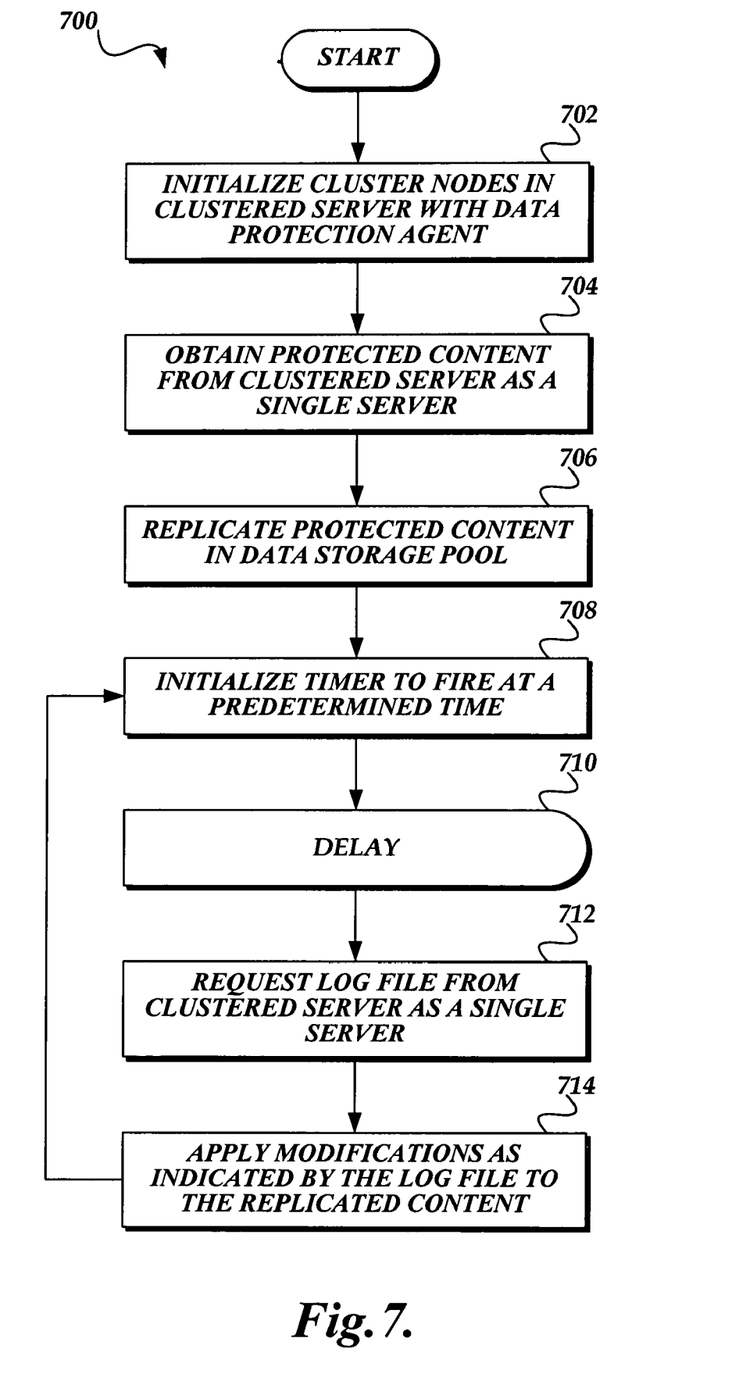
FIG. 7 is a flow diagram illustrating an exemplary routine for providing data protection to protected content on a clustered server.

FIG. 7 is a flow diagram illustrating an exemplary routine 700 for providing data protection to protected content on a clustered server 302. Beginning at block 702, the cluster nodes in the clustered server 302 are each initialized with a data protection agent and a file system filter (as described above in regard to FIG. 5).

At block 704, the data protection server 116 obtains the protected content from the clustered server (as a single server, and not specifically from the cluster node that has current access to the protected content). At block 706, the data protection server 116 replicates the protected content in the data storage pool 118.

At block 708, the data protection server 116 initializes a timer to fire at a predetermined time. In this manner, the data protection server 116 can periodically request the change records (in the log file 212) corresponding to the modifications made to the protected content, and use the change records to update the replicated content. At block 710, the routine delays until the timer described above fires, indicating that the routine 700 is to proceed.

At block 712, the data protection server 116 requests the log file 212 from the clustered server 302, treating the clustered server as a single server. This request is routed to by the clustered server 302 to the cluster node currently in actual communication with the protected content. In particular, the request is routed to the data protection agent 318 operating on the cluster node in actual/current communication with the protected content. In response, the data protection agent 318 requests the log file from the file system filter 312 on the cluster node, and returns it to the data protection server 116.

At block 714, after obtaining the log file 212 from the clustered server 302, the data protection server 116 applies the modifications, as defined by the change records in the log file 212, to the replicated content. Thereafter, the routine 700 returns to block 708 where a timer is initialized to fire at the time the data protection server 116 should update the replicated content.

While various embodiments have been illustrated and described, it will be appreciated that various changes can be made therein without departing from the spirit and scope of the invention.

The embodiments of the invention in which an exclusive property or privilege is claimed are defined as follows:

1. A data protection management system for protecting content controlled by a clustered server by treating the clustered server as a single entity, the data protection management system comprising: a data protection server; a data storage pool communicatively coupled to and controlled by the data protection server for storing a replicated copy of the protected content; and a clustered server comprising a plurality of cluster nodes, wherein each cluster node includes the following: a file system filter that is configured to, upon receiving notice of a modification to the protected content, generate a change record comprising information describing the modification, wherein only a single cluster node is in actual communication with the protected content at any given time such that only the file system filter on the cluster node in actual communication generates a change record for any given modification; a data protection agent that is configured to provide communications between the data protection server and the file system filter on the cluster node; wherein during the initialization of the data protection management system, the data protection server recognizes that the clustered server is a cluster, and initializes each cluster node of the cluster server with the data protection agent and the file system filter; and wherein upon each cluster node being initialized with a file system filter and a data protection agent, the clustered server is configured to receive communications from the data protection server that addresses the clustered server as a single entity such that upon receiving a notification from the data protection server of a pending dismount of the cluster node in actual communication with the protected content, the clustered server notifies the cluster node in actual communication with the protected content of the pending dismount such that the cluster node in communication flushes change records generated by its file system filter to a log file that is shared by each of the cluster nodes before the cluster node in communication dismounts; and wherein the clustered server is further configured to receive periodic requests from the data protection server that also addresses the clustered server as a single entity that requests the log file from the clustered server wherein the clustered server routes the request to the data protection agent operating on the cluster node in actual communication with the protected content such that the data protection agent operating on the cluster node in actual communication with the protected content responds by sending the log file to the data protection server where the change records stored in the log file are replicated to the replicated content in the data storage pool.

2. The data protection management system of claim 1, wherein the file system filter on each cluster node is further configured to initially store the generated change records in a records cache on the cluster node.

3. The data protection management system of claim 2, wherein the file system filter on each cluster node is further configured to flush the change records in the records cache to the log file when the file system filter cannot store any additional change records in the records cache.

4. The data protection management system of claim 3, wherein the file system filter on each cluster node is further configured to flush the change records in the records cache to the log file upon receiving notification that the protected content will be dismounted from the cluster node.

5. The data protection management system of claim 4, wherein the data protection server restores protected content by copying the replicated content in the data storage pool to the clustered server as a single server.

6. A computer-readable medium bearing computer-executable instructions which, when executed on a computer system, carry out a method for providing data protection services to content on a clustered server by treating the clustered server as a single entity, the method comprising:
   identifying that the clustered server is a cluster;
   initializing each cluster node in the clustered server with a file system filter;
   initializing each cluster node in the clustered server with a data protection agent, the data protection agent providing communications between the file system filter on the cluster node and a data protection server implementing the method;
   obtaining a copy of the protected content from the clustered server as a single server and creating a copy of the protected content in a data storage pool coupled to the computer system, the copy being the replicated content, wherein the copy is obtained by sending a request to the clustered server that addresses the clustered server as a single entity rather than addressing the cluster node that is in actual communication with the protected content such that upon receiving the request, the clustered server routes the request to the cluster node in actual communication which responds to the request by flushing change records generated by the file system filter on the cluster node in actual communication to a log file that is shared by each of the cluster nodes and sends the log file to the data protection server; and
   notifying the clustered server of a pending dismount of the cluster node in actual communication with the protected content, the notification being addressed to the clustered server as a single entity, wherein the clustered server routes the notification to the cluster node in actual communication with the protected content which responds to the notification by flushing change records generated by the file system filter on the cluster node in actual communication to the log file.

7. A computer implemented method for providing data protection services to content on a clustered server by treating the clustered server as a single entity, the method comprising:
   identifying that the clustered server is a cluster;
   initializing each cluster node in the clustered server with a file system filter;
   initializing each cluster node in the clustered server with a data protection agent, the data protection agent providing communications between the file system filter on the cluster node and a data protection server implementing the method;
   obtaining a copy of the protected content from the clustered server as a single server and creating a copy of the protected content in a data storage pool coupled to the computer system, the copy being the replicated content, wherein the copy is obtained by sending a request to the clustered server that addresses the clustered server as a single entity rather than addressing the cluster node that is in actual communication with the protected content such that upon receiving the request, the clustered server routes the request to the cluster node in actual communication which responds to the request by flushing change records generated by the file system filter on the cluster node in actual communication to a log file that is shared by each of the cluster nodes and sends the log file to the data protection server; and
   notifying the clustered server of a pending dismount of the cluster node in actual communication with the protected content, the notification being addressed to the clustered server as a single entity, wherein the clustered server routes the notification to the cluster node in actual communication with the protected content which responds to the notification by flushing change records generated by the file system filter on the cluster node in actual communication to the log file.

8. The method of claim 7, wherein each cluster node includes one or more record caches where the cluster node stores the change records.

* * * * *